Dec. 24, 1935.    J. R. MILLWARD    2,025,298
FREEWHEEL TRANSMISSION MECHANISM
Filed Oct. 8, 1931
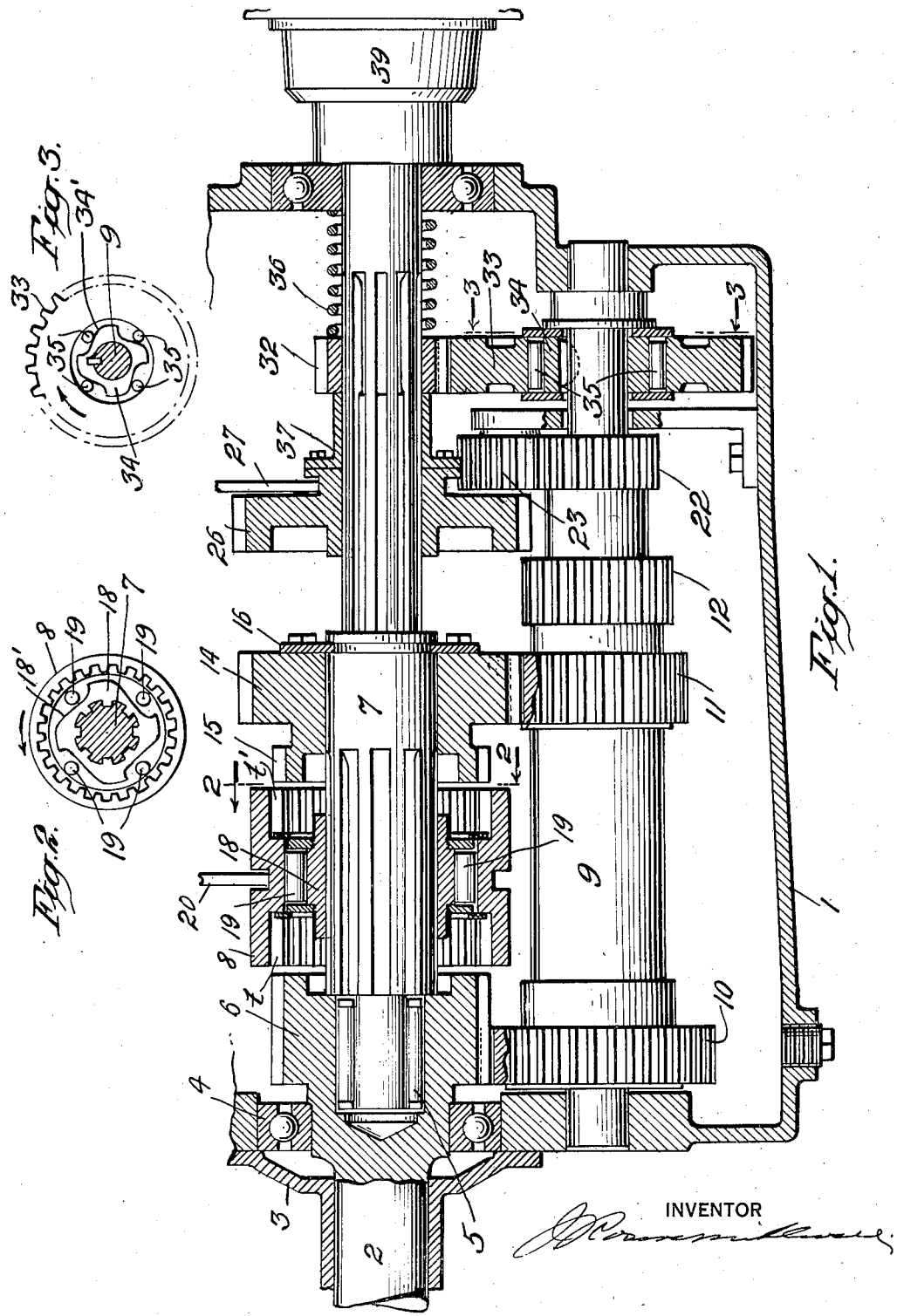
INVENTOR Patented Dec. 24, 1935

2,025,298

UNITED STATES PATENT OFFICE 2,025,298

FREEWHEEL TRANSMISSION MECHANISM

John Roscoe Millward, Tenafly, N. J.

Application October 8, 1931, Serial No. 567,551

10 Claims. (Cl. 74—343)

This invention relates to improvements in automobile transmission mechanisms of the free wheeling type and is designed to eliminate certain danger factors of the free wheeling drives as at present employed in addition to possessing other desirable features and advantages thereover.

As will be appreciated, the present type of free wheeling mechanism as commonly used in its action allows of the wheels running totally free and in advance of the motor, the effect being similar to releasing of the clutch while riding with the conventional drive. Accordingly, in the normal operation of the free wheeling mechanism there are present the danger factors of first, excessive momentum under conditions difficult and dangerous to reshift to conventional drive and, secondly, the perhaps greater danger of stalling of the idling motor, with unexpected lack of acceleration when needed as under the situation of passing of another car with oncoming traffic.

In accordance with my present invention the aforesaid danger factors are eliminated or materially reduced by an improved arrangement providing a limited free wheeling action so as to retain the desirable braking effect of the motor at the higher speeds and further insuring against stalling of the motor by means of a constantly operating driving connection from the driven wheels to the motor whereby the latter must turn over if the car is moving in gear.

The foregoing and other important features and advantages of my present improvements will be more fully understood by reference to the accompanying drawing wherein like reference characters are applied to the corresponding parts in the several views.

In the drawing:

Fig. 1 is a vertical, longitudinal sectional view showing my improved transmission mechanism in an approved form.

Fig. 2 is a cross-sectional view taken on line 2—2 of Fig. 1 showing the free-wheeling clutch in the usual arrangement.

Fig. 3 is a similar view taken on line 3—3 of Fig. 1 showing the supplemental and reversely acting free wheel clutch of the present invention.

In the approved embodiment of the features of my invention as here shown 1 indicates the usual casing of the transmission mechanism provided with suitable bearings for the drive shaft 2. The drive shaft 2 is driven from the crank shaft of the usual motor, or internal combustion engine, through the usual clutch in the conventional manner. The transmission case bearing for the drive shaft is shown at 4 with the usual protective sleeve 3. Within the casing the drive shaft 2 is formed with the driving gear 6 provided internally with a bearing 5 for the forward end of the driven shaft 7, journalled at its opposite end in the casing. At 9 there is shown the usual counter-shaft journalled at its ends in the casing and having fixed thereon the gear 10 in constant mesh with the drive gear 6 whereby the counter-shaft and the drive shaft are connected to rotate in counter relation.

Conforming to the usual arrangement, the counter-shaft 9 has fixed thereon a second gear pinion 11 and first speed gear 12; the second speed gear being in mesh with a co-acting second gear 14 journalled on the driven shaft 7 and secured against longitudinal movement by the split key ring 16 engaging an annular groove in the shaft 7. The other gear members, as shown in the conventional arrangement, are the shiftable gear 26 keyed to be slidable on the driven shaft to mesh with the first speed gear 12 when shifted to the left and to engage with intermediate gear 23 when shifted to the right of the neutral position as shown; the intermediate gear being in mesh with the usual reverse gear 22 on the counter-shaft 9.

At 8 there is indicated the usual shiftable coupler member provided with internal teeth t and t' positioned to effect coupling engagement with the teeth of the drive gear 6 when shifted to the left of the neutral position, as shown, and to effect coupling engagement with the gear 14, when shifted to the right, by engagement of the teeth t' with the teeth 15 formed integral with gear 14. As is readily understood, the shiftable member 8 is controlled by a depending arm or fork 20 of the usual shift lever structure and when shifted to the left establishes direct driving or high speed connection and when shifted to the right establishes second gear driving connection in the manner well understood. At 27 is shown the fork or actuator from the shift lever to establish first speed and reverse driving relation.

The coupling member 8, as shown, is slidably keyed to the driven shaft 7 with an interposed free wheeling clutch in the arrangement whereby the member 8 will transmit its motion to the driven shaft when the former tends to rotate in advance of the driven shaft while permitting overrunning of the driven shaft when the latter rotates in advance of the member 8. To this end, the clutch member 8 surrounds a cam ring member 18 slidably keyed to the shaft 7 and formed with segmental, peripheral cams 18' as best shown in Fig. 2 and clutch rollers 19 are interposed between said cams and an internal bearing surface of the clutch member 8. The contour of the cams is such as to effect coupling of the parts in one direction of relative movement, i. e. when the drive shaft tends to drive the driven shaft and to allow free running in the other direction of relative movement i. e. when the driven shaft rotates in advance of the drive shaft thereby providing free wheeling in the well known manner.

In accordance with the present invention as shown, I have incorporated with the described transmission of substantially conventional free wheeling type, means operative to limit the free wheeling action and likewise to insure turning over of the motor under the free wheeling operation as a safeguard against stalling. To this end there is provided supplemental gearing connection between the driven and drive shafts having a low gearing relation from the driven shaft to the drive shaft and having incorporated therein a free-wheel or over-running clutch having a reverse action to the conventional free-wheeling clutch.

As shown, the supplemental gearing comprises a small gear 32 slidably keyed on the driven shaft 7 in position to have engagement with the teeth of a gear 33 mounted upon the counter-shaft 9 with an interposed free wheeling clutch. The free wheeling or over-running clutch connection between the shaft 9 and the gear 33 includes the cam ring member 34 keyed to the shaft 9 and formed with the cams 34' as shown in Fig. 3 engaging rollers 35 which likewise engage an inner bearing surface of the gear 33 to establish a free wheeling coupling between the shaft 9 and the gear 33. As best shown in Fig. 3, the direction of coupling engagement is such as to be effective upon the advance driving of the gear 33 by the driven shaft and at a speed of rotation of the gear 33 in advance of the speed of the counter-shaft 9. By reason of the smaller gear 32 on the driven shaft and the larger gear 33 on the counter-shaft, this coupling engagement will only occur when the driven shaft reaches the increased relative speed determined by the gearing ratio, as here shown approximately two and a half times the speed of the counter-shaft. Accordingly, with the motor having an idling speed of about ten miles per hour car speed, the car is permitted to free wheel in the ordinary sense up to a speed of about twenty-five miles per hour after which the reversely action clutch 34—35 will cause the driven shaft to drive the counter-shaft and through it the drive shaft thereby reacting upon the motor to obtain the desired braking effect. As will be obvious, speeding up of the motor will correspondingly allow free wheeling at greater speeds as desired.

To allow of reverse drive in the usual manner, the reverse shift gear 26 is provided with a sleeve 37 surrounding the driven shaft 7 in position to engage the supplemental gear 32 and to shift the latter to the right and out of engagement with the gear 33 when the gear 26 is shifted into reverse-position in engagement with gear 23. A spring 36 is fitted over the shaft 7 in engagement with the gear 32 and with a fixed part to operate normally to shift the gear into operating engagement with the gear 33 and as shown the key way in the shaft 7 for the gear 32 is slightly deepened to provide a stop shoulder to limit the left movement of the gear 32.

As will be understood, the reversely acting driving connection from the driven shaft to the drive shaft as thus afforded will insure that the motor rotates during free wheeling condition thereby to a large degree overcoming the danger incident to the stalling of an idling motor which might otherwise occur, particularly after extended use.

As will also be appreciated, the improved limited free wheeling action will likewise greatly facilitate the shifting of gears in the operation of the car without de-clutching as in the conventional free wheeling.

While I have shown and described an approved embodiment of the features of my present invention, it will be understood that various modifications may be made therein without departing from the scope of the invention as defined in the appended claims. As illustrative thereof, while I have shown the supplemental gearing included within the transmission casing it will be understood that same might be incorporated with a conventional transmission device by extending the countershaft and driven shafts and supporting the supplemental parts external of the casing proper.

Having described my invention, I claim:

1. Transmission mechanism of the character described comprising a drive shaft and a driven shaft, variable speed driving connections between said shafts, a free wheeling clutch incorporated with the driving connections to permit advance rotation of the driven shaft with relation to the drive shaft and supplemental gearing means between the driven and drive shafts including an over-running clutch operative for coupling the supplemental gearing means when the driven shaft rotates in the direction to drive the drive shaft and with a multiple speed ratio with relation to the drive shafe rotation and means operative to disconnect the supplemental gearing means to allow of reverse drive.

2. Transmission mechanism of the character described comprising a drive shaft and a driven shaft, variable speed gearing means between said shafts including a counter-shaft rotatably connected to the drive shaft, gears on the counter-shaft, shiftable coupling means on the driven shaft and a free wheeling clutch incorporated with the coupling means to permit advance rotation of the driven shaft with relation to the drive shaft and supplemental gearing means between the driven and drive shafts comprising a smaller gear slidably keyed on the driven shaft, a co-acting larger gear surrounding the counter-shaft and connected thereto by an overrunning clutch operative for coupling the supplemental gearing means when the driven shaft tends to drive the counter-shaft in advance relation and means operative to disengage the supplemental gearing means to allow of reverse drive.

3. Transmission mechanism of the character described comprising a drive shaft and a driven shaft, variable speed gearing means between said shafts including a counter-shaft rotatably connected to the drive shaft, gears on the counter-shaft, shiftable coupling means on the driven shaft and a free wheeling clutch incorporated with the coupling means to permit advance rotation of the driven shaft with relation to the drive shaft and supplemental gearing means between the driven and drive shafts comprising a smaller gear slidably keyed on the driven shaft, a co-acting larger gear surrounding the counter-shaft and connected thereto by an overrunning clutch operative for coupling the supplemental gearing means when the driven shaft tends to drive the counter-shaft in advance relation, a reverse shift member on the driven shaft adapted to engage the smaller gear to shift it out of mesh during reverse drive and a spring positioned normally to move the smaller gear into operating mesh.

4. A transmission mechanism for automobiles comprising a drive shaft and a driven shaft, variable speed driving connections between said shafts, a free wheeling clutch incorporated with the driving connections and operative to permit advance rotation of the driven shaft with relation to the drive shaft for automotive free wheeling operation and supplemental gearing means from the driven to the drive shafts having a ratio of more than two to one and including an overrunning clutch operative for coupling the gearing means when the driven shaft rotates in the direction to drive the drive shaft at a relatively high speed with relation thereto.

5. An automobile transmission of the free wheeling type having in combination with a driving shaft and a driven shaft, of variable speed ratio drive connections therebetween, a free wheel clutch incorporated with the drive connections to be operative to permit overrunning of the driven shaft with relation to the drive shaft, supplemental gearing between said driven and drive shafts and an overrunning clutch associated therewith to be operative rotatively to connect the driven and drive shafts when the driven shaft rotates in advance of the drive shaft at a substantially increased speed ratio to provide an automotive free wheeling range of operation with a determined safety limit thereto.

6. Transmission mechanism of the character described comprising a drive shaft and a driven shaft, variable speed driving connections between said shafts, a free wheeling clutch incorporated with the driving connections and operative to permit advance rotation of the driven shaft with relation to the drive shaft and supplemental gearing means between the driven and drive shafts including an overrunning clutch in reverse relation to said free wheeling clutch to limit the free wheeling action of the latter.

7. Transmission mechanism of the character described comprising a drive shaft and a driven shaft, a free wheeling clutch interposed between said shafts and operative to permit advance rotation of the driven shaft with relation to the drive shaft and gearing means between the driven and drive shafts including an overrunning clutch in reverse operating relation to said free wheeling clutch to limit the advance rotation of the driven shaft with relation to the drive shaft in a determined ratio.

8. Transmission mechanism of the character described comprising a drive shaft and a driven shaft, variable speed driving connections between said shafts, a free wheeling clutch incorporated with the driving connections and operative to permit advance rotation of the driven shaft with relation to the drive shaft and supplemental gearing means between the driven and drive shafts including an overrunning clutch operative for coupling the gearing means when the driven shaft rotates in the direction to drive the drive shaft and with a multiple speed ratio with relation to the drive shaft rotation.

9. In a transmission mechanism of the character described the combination of a driving shaft and a driven shaft, of variable speed ratio drive connections therebetween, a free wheel clutch incorporated with the drive connections to be operative to permit overrunning of the driven shaft with relation to the drive shaft, supplemental gearing between said drive and driven shafts and a clutch associated therewith to be operative to rotatively connect the drive and driven shafts when the latter rotates in advance of the drive shaft at a determined increased speed ratio.

10. A transmission mechanism comprising a drive shaft and a driven shaft, a uni-directional clutch device interposed therebetween adapted to allow overrunning of the driven shaft in relation to the drive shaft and circuitous gearing connections between said shafts including an overrunning clutch in reverse operating relation to said first clutch and said gearing connections providing for gearing reduction between the driven shaft and the drive shaft to allow of overrunning of the driven shaft in relation to the drive shaft in a determined ratio.

JOHN ROSCOE MILLWARD.